US011419200B2

United States Patent
Yen

(10) Patent No.: US 11,419,200 B2
(45) Date of Patent: Aug. 16, 2022

(54) SYSTEM USING HANDHELD DEVICE FOR PROGRAMMING LIGHTING INSTRUMENTS

(71) Applicant: Yun-Hsiao Yen, Taipei (TW)

(72) Inventor: Yun-Hsiao Yen, Taipei (TW)

(73) Assignee: Cincon Electronics Co., Ltd, Taipei (TW)

(*) Notice: Subject to any disclaimer, the term of this patent is extended or adjusted under 35 U.S.C. 154(b) by 0 days.

(21) Appl. No.: 17/153,905

(22) Filed: Jan. 21, 2021

(65) Prior Publication Data

US 2021/0144835 A1 May 13, 2021

(51) Int. Cl.
| | |
|---|---|
| *H05B 47/155* | (2020.01) |
| *H04M 1/72412* | (2021.01) |
| *H05B 47/19* | (2020.01) |
| *H04M 1/72415* | (2021.01) |
| *H05B 47/18* | (2020.01) |

(52) U.S. Cl.
CPC ...... *H05B 47/155* (2020.01); *H04M 1/72412* (2021.01); *H04M 1/72415* (2021.01); *H05B 47/18* (2020.01); *H05B 47/19* (2020.01)

(58) Field of Classification Search
CPC ........ H05B 47/10; H05B 47/18; H05B 47/19; H05B 47/155; H05B 47/165; H05B 47/175; H04M 1/72412; H04M 1/72415
See application file for complete search history.

(56) References Cited

U.S. PATENT DOCUMENTS

| | | | |
|---|---|---|---|
| 8,742,686 B2* | 6/2014 | Zampini, II | H05B 45/00 315/297 |
| 2006/0022214 A1* | 2/2006 | Morgan | H05B 45/3725 257/E25.032 |
| 2006/0202851 A1* | 9/2006 | Cash | H05B 47/195 340/12.23 |
| 2008/0258646 A1* | 10/2008 | Beij | H05B 47/175 315/291 |
| 2012/0306621 A1* | 12/2012 | Muthu | H05B 47/19 340/10.5 |
| 2014/0139140 A1* | 5/2014 | Yeh | H05B 47/19 315/297 |
| 2015/0022123 A1* | 1/2015 | Van De Sluis | H05B 47/10 315/312 |
| 2015/0223308 A1* | 8/2015 | Yen | G06F 3/0484 715/835 |
| 2019/0121640 A1* | 4/2019 | Brown | G05B 15/02 |
| 2019/0281688 A1* | 9/2019 | Yen | G06F 3/0486 |

* cited by examiner

*Primary Examiner* — Haissa Philogene

(57) ABSTRACT

A system using a handheld device for programming lighting instruments, which is operable on the DALI system, includes a wireless control module electronically connected and integrated with the DALI system; and a handheld device, having two-way communication with the wireless control module wirelessly. The handheld device has a graphical user interface wherein the graphical user interface has functional blocks. One functional block, which programs groups of functional blocks, includes menus. The screen of each menu is divided into first and second display areas. The handheld device accesses the initialized addresses of the lighting instruments in the DALI system from the wireless control module and displays the non-programmed icons of lighting instruments in the DALI system in the second display area. By dragging the lighting instrument icons displayed in the second display area into the first display area, programming groups of the lighting instruments can be accomplished.

4 Claims, 5 Drawing Sheets

SYSTEM USING HANDHELD DEVICE FOR PROGRAMMING LIGHTING INSTRUMENTS

CROSS-REFERENCE TO RELATED APPLICATION

This application is a continuation-in-part (CIP) of U.S. patent application Ser. No. 16/420,166, filed May 23, 2019, now abandoned, which is incorporated herein by reference in its entirety.

BACKGROUND OF THE INVENTION

1. Field of the Invention

The invention relates to a system using a handheld device for programming lighting instruments and a method thereof, especially, a system using a handheld device for programming lighting instruments and a method thereof that can be remotely set up, control all lighting instruments and integrate the on/off function of all lighting instruments.

2. Description of Related Art

The general lighting systems has entered the age of digital control currently. Therefore, a Digital Addressable Lighting Interface (DALI) communication protocol for digital dimming signal was developed. The DALI is a standard control protocol, which was developed and specified for lighting equipment, having the digital addressable function to perform one-to-one or one-to-many dimming control. Its advantage is to provide those who program the lighting system designs to have a flexibly adjustable, easy to build, easy to maintain system.

However, the current DALI system has been having the issue of lighting instrument installation. When a DALI system controls a lighting instrument with 64 already assigned addresses, there will be 64 different addresses to be programmed into DALI member groups, making the task to be practically difficult. In addition, users need to perform complicated setup prior to the installation and install lighting instruments one by one according to the lighting instrument planning diagrams. As a result, regular users are unable to conduct the installation and modification by themselves. All installation, setup, or modification must completely rely on the system vendors.

Therefore, how to achieve the realization of an easy setup for programming lighting instruments and, easy and convenient to control, becomes an issue that urgently needs to be resolved by the industry.

SUMMARY OF THE INVENTION

It is therefore one object of the invention to provide a system using a handheld device for programming lighting instruments, the system being operable on a Digital Addressable Lighting Interface (DALI) system, the system comprising:

A handheld device including a graphical user interface; and a plurality of programming groups each including a plurality of functional blocks having a plurality of menus wherein a screen of each menu is divided into a first display area and a second display area; wherein each lighting instrument includes a plurality of non-programmed icons in the DALI system, the non-programmed icons being displayed in the second display area; wherein the DALI system is configured to enable the programming groups in response to an identification that the non-programmed icons for each lighting instruction display in the second display area are dragged to the first display area; wherein the DALI system includes a DALI bus and a lighting instrument set; wherein the DALI bus is electrically connected to a wireless control module and the lighting instrument set is electrically connected to the DALI bus; and wherein the DALI bus front end has a microprocessor that can integrate the information in the DALI system before transmitting to the wireless control module.

The above and other objects, features and advantages of the invention will become apparent from the following detailed description taken with the accompanying drawings.

DETAILED DESCRIPTION OF THE INVENTION

Figure 1:
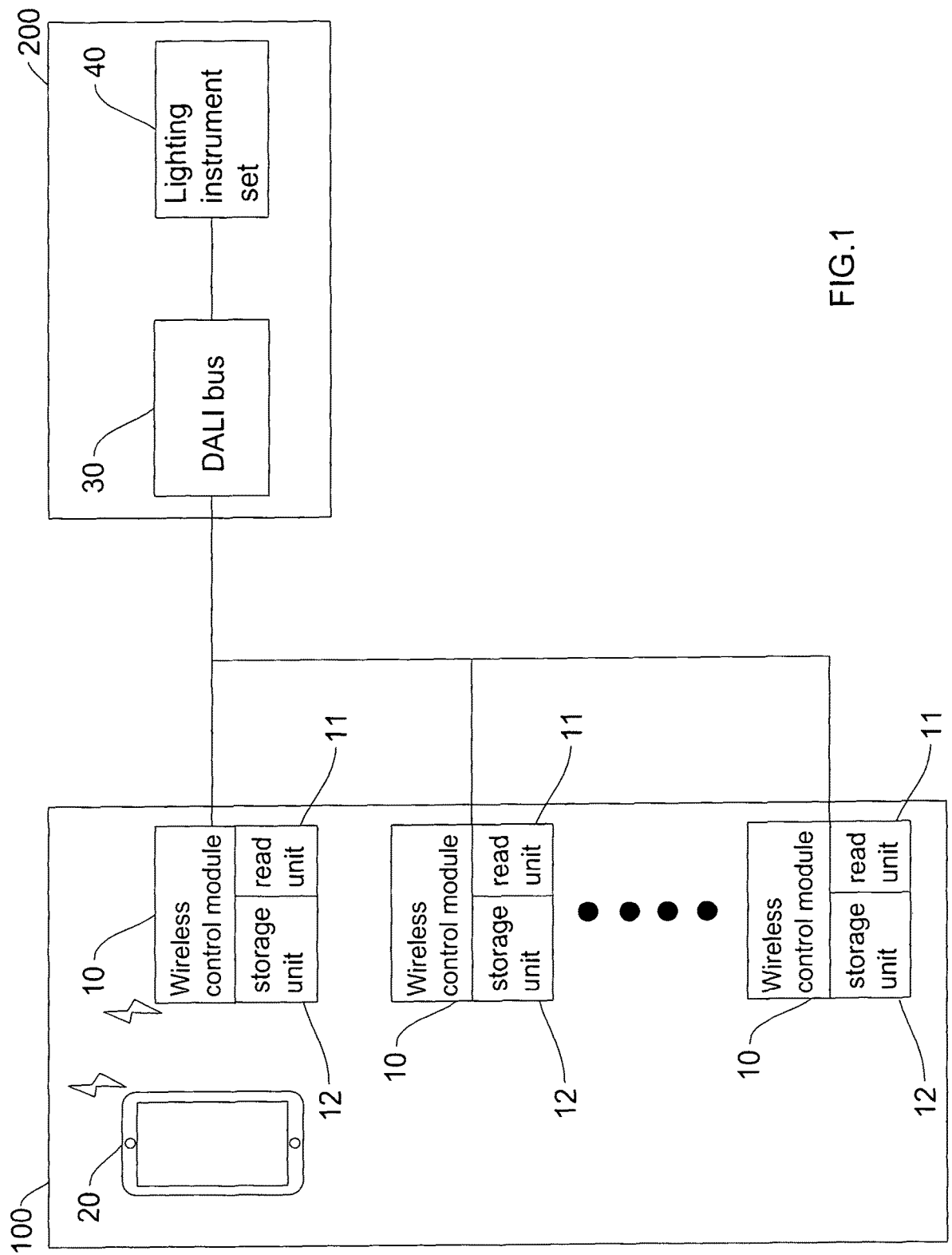
FIG. 1 is a schematic diagram of the system using a handheld device for programming lighting instruments of the invention.

Referring to FIG. 1, a system 100 using a handheld device for programming lighting instruments of the invention is shown. The system 100 is operable on the DALI system 200 and comprises a wireless control module 10 electronically connected to the DALI system 200, and a handheld device 20 having two-way communication with the wireless control module 10 wirelessly.

The handheld device 20 accesses the initialized addresses of the lighting instruments in the DALI system 200 from the wireless control module 10. The handheld device 20 has a graphical user interface (FIG. 2) for users to use the graphical user interface for programming groups of non-programmed lighting instruments in the DALI system 200.

The DALI system 200 comprises a DALI bus 30 and a lighting instrument set 40 wherein the DALI bus 30 is electrically connected to the wireless control module 10 and the lighting instrument set 40 is electrically connected to the DALI bus 30. Thus, the handheld device 20 accesses the initialized addresses of the lighting instruments 40 in the DALI system 200 from the wireless control module 10, and users can program each lighting instrument into groups by using the graphical user interface of the handheld device 20.

Moreover, the user uses the wireless communication function of the handheld device 20 to connect to the wireless control module 10 and uses the handheld device 20 to activate the wireless control module 10 to initialize the DALI system 200. The user then edits the DALI system 200 based on his or her preference. Each DALI system 200 can be associated with at least one wireless control module 10. The number of the wireless control module 10 provided increases as the number of the handheld device 20 in the same space increases. Thus, the number of the handheld device 20 connected to each wireless control module 10 can be decreased. In case of more than 2 wireless control modules 10 associated with the DALI system 200, each wireless control module 10 is connected to the DALI system 200 by wire. Each wireless control module 10 includes a read unit 11 and a storage unit 12. The read unit 11 always connects to the DALI system 200 online and detects whether data in the DALI system 200 is updated or not. If the read unit 11 detects that there is updated data in the DALI system 200, the read unit 11 further reads the updated data and stores the updated data in the storage unit 12. As a result, data in each wireless control module 10 is updated synchronously. When the user uses the handheld device 20 to connect to the wireless control module, the handheld device 20 is connected to the wireless control module 10 having a strongest signal. The multiple wireless control modules 10 are associated with the handheld device 20 in a distributed manner, thereby achieving the purpose of establishing a distributed host.

Figure 2:
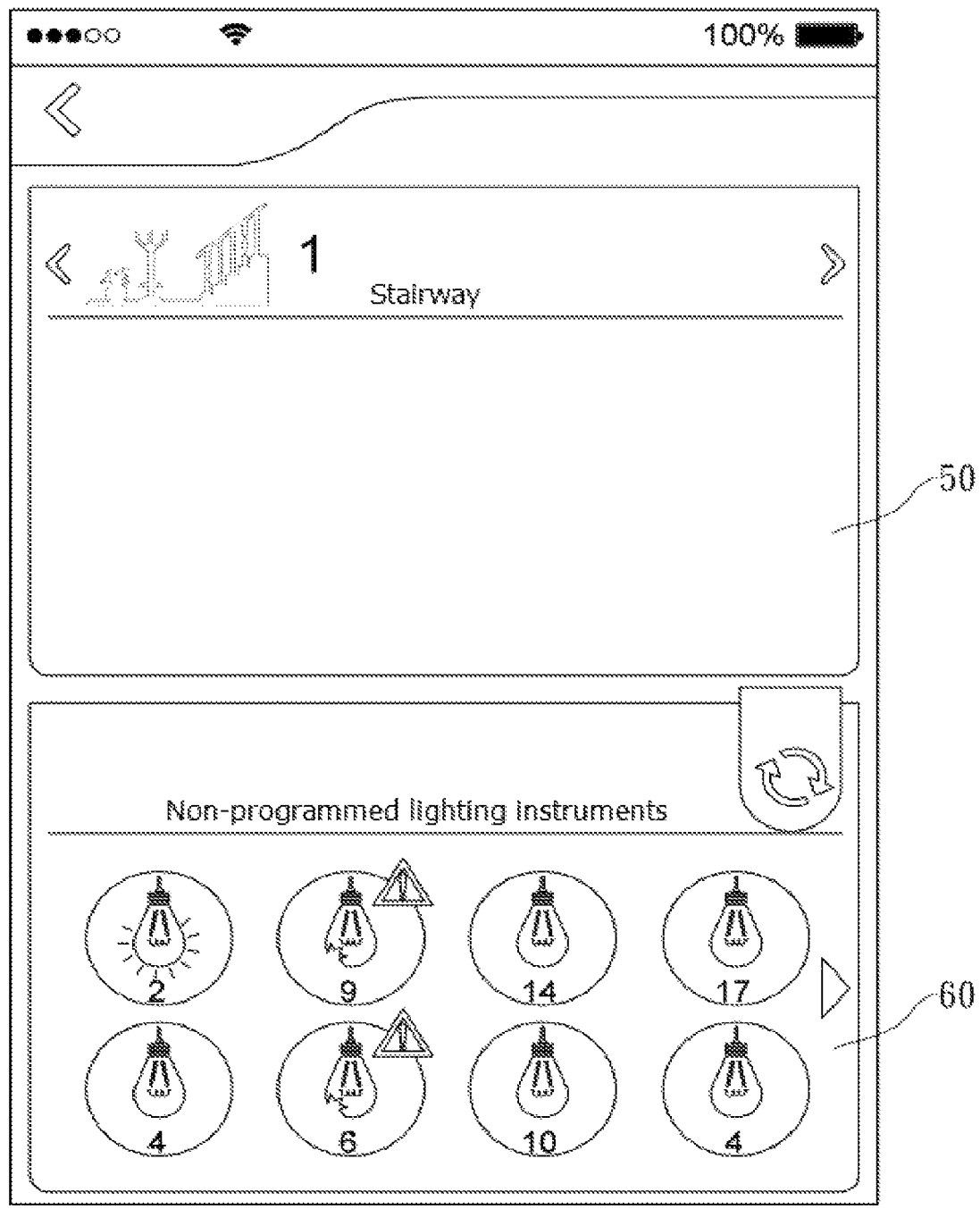
FIG. 2 is a schematic diagram of the graphical user interface of the system using a handheld device for programming lighting instruments of the invention.

Referring to FIG. 2, a graphical user interface of the system 100 using a handheld device for programming lighting instruments of the invention comprises a plurality of functional blocks. The plurality of functional blocks comprise functions of programming groups, dimming control, logout, addition of different environment modes, and resetting (not shown). The functional block comprises a plurality of menus (not shown) wherein the screen of each menu of the programming groups is divided into a first display area 50 and a second display area 60. The first display area 50 is for users to name each menu, which is to be programmed, by editing. The home living environment is taken as an example. Using the terms, stairway, kitchen, bathroom, master bedroom, guest room, study room, children room, living room, etc., program the initialized lighting instruments into different groups through programming groups of lighting instruments so that it is convenient for users to adjust and control different groups of lighting instruments.

Figure 3:
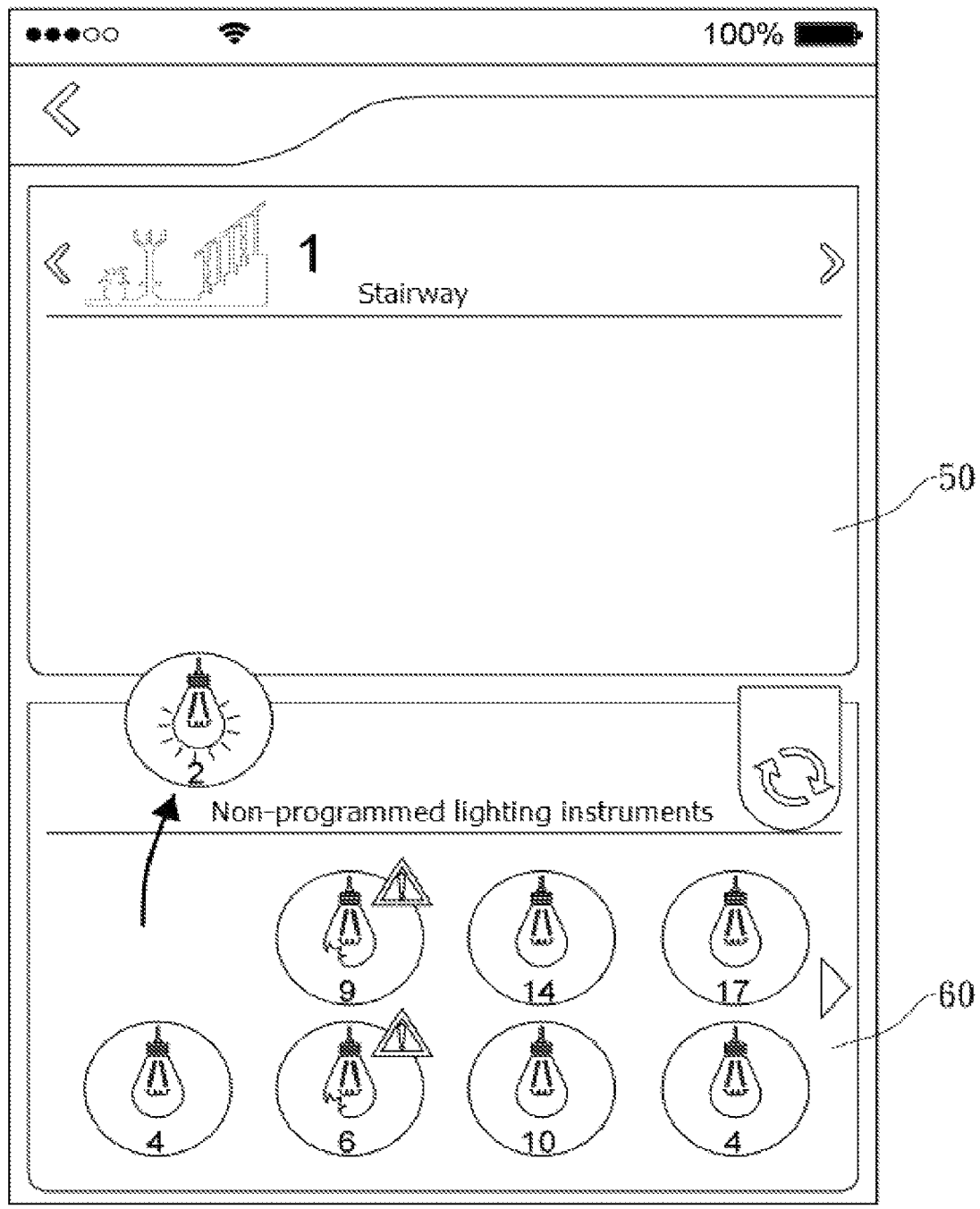
FIG. 3 is a schematic diagram of the dragging operation of the graphical user interface of the system using a handheld device for programming lighting instruments of the invention.
Figure 4:
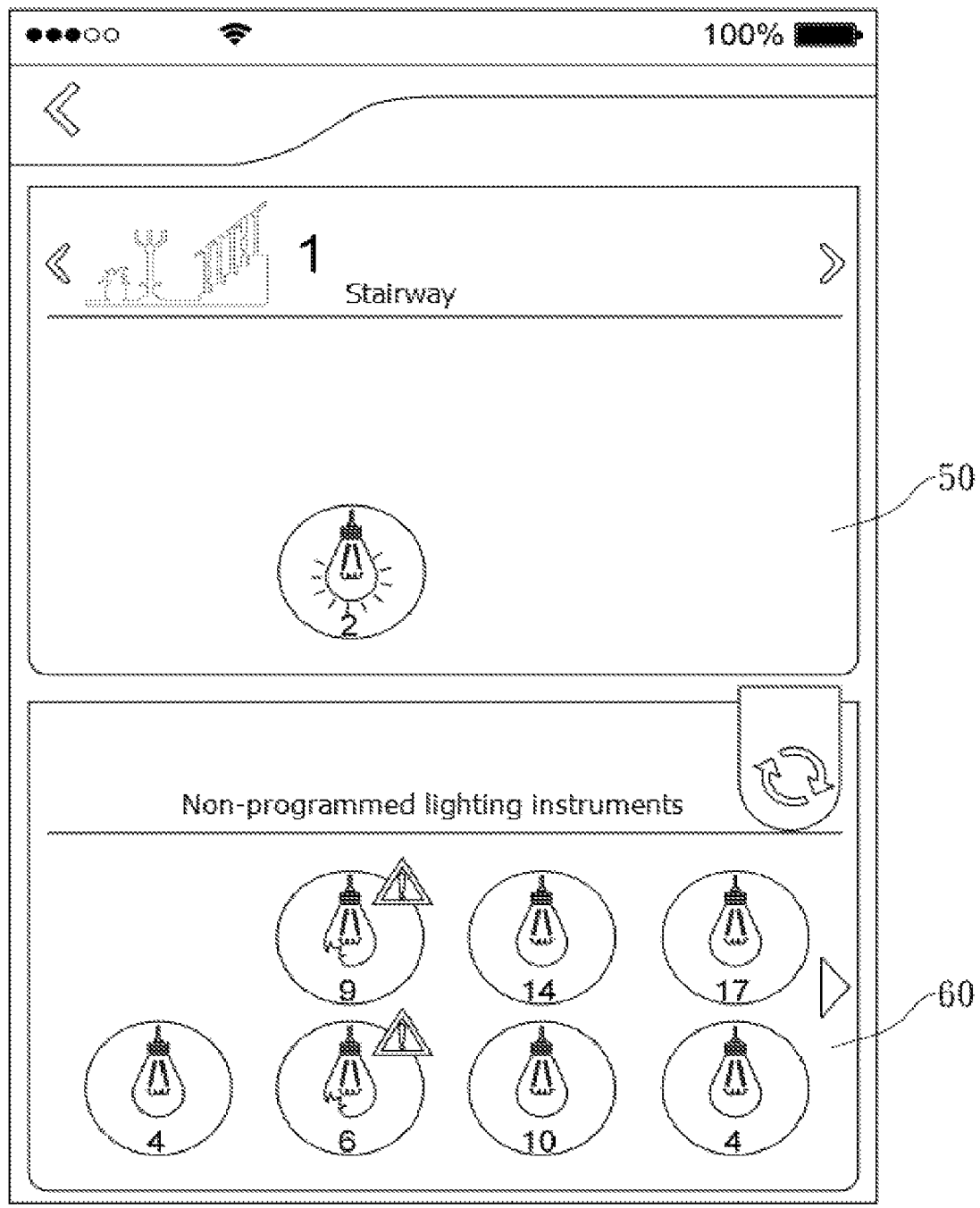
FIG. 4 is a schematic diagram of the completion of operation of the graphical user interface of the system using a handheld device for programming lighting instruments of the invention.

Referring to FIGS. 3 and 4 in conjunction with FIG. 2, in this embodiment programming the lighting instruments in the stairway is used as an example. When the handheld device 20 accesses the initialized addresses of the lighting instruments in the DALI system 200 from the wireless control module 10, the icons of non-programmed lighting instruments in the DALI system 200 are displayed in the second display area 60. As shown in FIG. 2 specifically, there are a plurality of non-programmed lighting instruments. To program the lighting instrument (labeled "2") to the group of stairway, drag the lighting instrument icon (labeled "2") in the second display area 60 into the first display area 50 (as shown in FIG. 3) to complete the programming groups of the lighting instrument (labeled "2") (as shown in FIG. 4). With the same token, if another lighting instrument is to be programmed in the group of stairway, using the dragging method to drag the non-programmed lighting instrument icon (shown in the second display area 60) into the first display area 50. Or, if user desires to add another lighting instrument in the group of kitchen, selects the kitchen menu and uses the dragging method to drag the non-programmed lighting instrument icon (shown in the second display area 60) into the first display area 50 in order to complete programming the group, thereby having overall control of the stairway group or kitchen group individually. Besides, in this embodiment, the wireless control module 10 is a WIFI controller or Bluetooth® controller, and the handheld device 20 is a mobile phone, a tablet computer, or any other computer, communication, consumer (3C) product.

In this case, the DALI bus front end has a microprocessor that can integrate the information in the DALI system before transmitting to the wireless control module. The wireless communication module only transmits information functions without integrated information function, so the transmission is performed. Function and information integration processing is a separate operation. In particular, in terms of the principle of operation, there is more information integration, and the function of transmission and data processing. Regardless of the wireless transmission method, the wireless control module must be available. In order to transfer to the handheld device, the infinite control module should include the function of the microprocessor, not just WIFI or Bluetooth transmission.

As stated above, the DALI system 200 is electrically connected to the lighting instruments and is capable of programming the lighting instruments. The conventional DALI system may control at least 64 addresses (e.g., specifically programmed addresses or Internet Protocol (IP) addresses) via the system 100. In contrast, the DALI system 200 of the invention may send each address (e.g., specifically programmed addresses or IP address) to the wireless control module 10 or program each address. Further, the DALI system 200 of the invention may send data of the address of each lighting instrument to the handheld device 20. And in turn, the handheld device 20 may program the address (e.g., specifically programmed address or IP address) of each lighting instrument. The programming is done by neither controlling the DALI system 200 nor by wirelessly controlling the lighting instrument. It is envisaged by the invention that the invention aims to solve the problems of too many addresses to be programmed correctly as encountered by the conventional art. Thus, the invention may send each address (e.g., specifically programmed addresses or IP address) the handheld device 20 through the wireless control module 10. Therefore, the handheld device 20 may program the addresses.

As discussed above, the DALI system 200 is electronically connected to the wireless control module 10 and is capable of storing initial addresses (e.g., specifically programmed addresses) of each lighting instrument via the wireless control module 10. And in turn, the wireless control module 10 sends the addresses to the handheld device 20. A user may operate the dragging and editing module of the handheld device 20 to program the initial addresses (e.g., specifically programmed addresses) of the current lighting instrument and further edit same in his or her desired group. The editing may be done to set a desired lighting mode of the group and the lighting mode may be named as sleep mode or party mode. For example, some lighting instruments of the group are lit or only one lighting instrument of the group is lit. The programming is set as a group mode. Thus, it is capable of not only controlling the lighting instruments remotely but also programming the lighting instruments of the group. It is envisaged by the invention that the lighting instruments connected to the DALI system 200 may be programmed to be effectively controlled in a simple and reliable way.

It is noted that the DALI system 200 can control the lighting instruments not only by wire but also via the wireless control module 10.

And in turn, the wireless control module 10 may store the initial addresses (e.g., specifically programmed addresses) of each lighting instrument via the wireless control module 10 and sends same to the handheld device 20 which in turn programs the initial addresses (e.g., specifically programmed addresses) of the lighting instrument rather than directly controlling the DALI system 200. In brief, the handheld device 20 is capable of programming the groups and setting the conditions.

On the contrary, to remove the programmed group of a lighting instrument, select the menu from a programmed group where the lighting instrument belongs; using the dragging method, drag an icon of a specific programmed lighting instrument shown in the first display area 50 into the second display area 60 to remove programming the group. After, users can program this lighting instrument again. Those familiar with this domain of technology can reason and understand this process, and thus no further explanations and diagrams are provided here. One thing is worth to mention that icons of lighting instruments marked with a warning sign in FIG. 2 to FIG. 4 of the invention are damaged lighting instruments to be replaced by the users.

Figure 5:
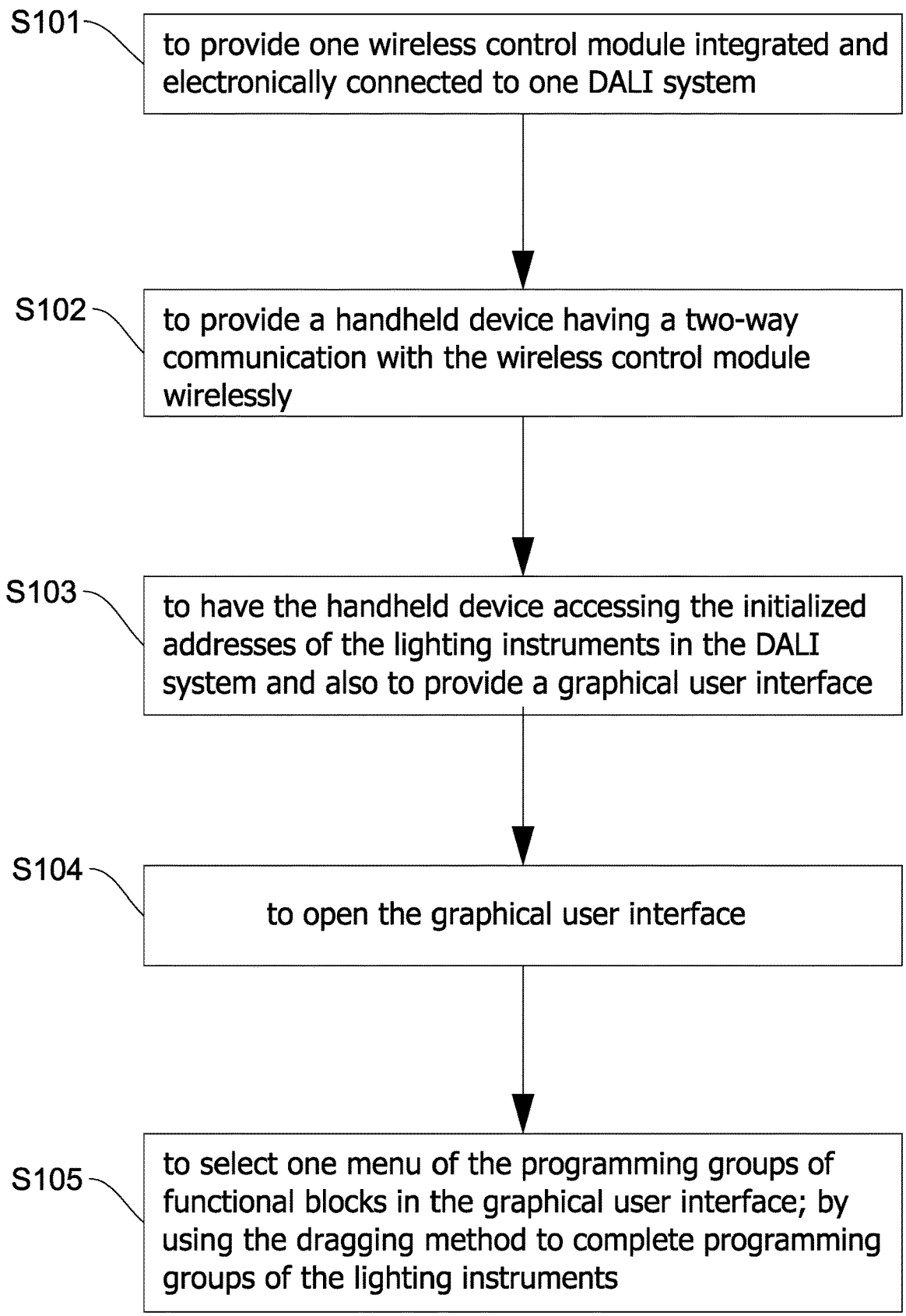
FIG. 5 is a flowchart of the method of using a handheld device for programming lighting instruments of the invention.

Referring to FIG. 5, a method of using a handheld device for programming lighting instruments of the invention which is operable on the DALI system, includes the following steps: to provide at least one wireless control module integrated and electronically connected to one DALI system (S101); to provide a handheld device having a two-way communication with the wireless control module wirelessly (S102); to have the handheld device accessing the initialized addresses of the lighting instruments in the DALI system from the wireless control module and also to provide a graphical user interface (S103); to open the graphical user interface and to automatically search for the current configuration condition of a plurality of lighting instruments accessed by the wireless control module (S104); to select one menu of the programming groups of functional blocks in the graphical user interface wherein the screen of the menu is divided into a first display area and a second display area; the non-programmed icons of lighting instruments in the DALI system are displayed in the second display area; by dragging the lighting instrument icons displayed in the second display area into the first display area, programming groups of the lighting instruments can be accomplished (S105).

The method of using a handheld device for programming lighting instruments of the invention further includes the following steps: to select one menu of programming groups of functional blocks in the graphical user interface wherein the programmed icons of lighting instruments in the DALI system are displayed in the first display area. In addition, by dragging the lighting instrument icons displayed in the first display area into the second display area, programming groups of lighting instruments can be removed.

The system using a handheld device for programming lighting instruments and the method thereof of the invention, by letting users use a handheld device which is installed with a graphical user interface software and incorporate with a wireless device of having two-way communication with the wireless control module wirelessly, to program the setup and dimming control remotely can be achieved, so that users can easily program and control groups of the lighting instruments remotely.

In short, the invention uses the typical DALI system to control respective lighting instruments. The typical DALI system can assign 64 addresses to a lighting instrument. An address can be taken as an IP address. The 64 addresses (e.g., IP addresses) are connected to the wireless control module 10 and stored in the wireless control module 10. And in turn, the wireless control module 10 sends the addresses (e.g., IP addresses) to the handheld device 20. Thus, a user may edit the respective addresses and set same by using the handheld device 20. The invention uses the handheld device 20 to manage at least 64 addresses of a lighting instrument and edits the group.

Through the DALI system, the lighting instruments can be programmed by the group, and the graphical user interface is used to plan the group configuration. When a lighting instruments group (or a specific lighting instrument) is selected, the lighting instruments in the group are lit. The particular lighting instruments will flash to create a two-way interaction because of the group planning function through the handheld device. It is easier to identify the location of the lighting instruments or the lighting instruments group.

While the invention has been described in terms of preferred embodiments, those skilled in the art will recognize that the invention can be practiced with modifications within the spirit and scope of the appended claims.

What is claimed is:

1. A system using a handheld device for programming lighting instruments, the system being operable on a Digital Addressable Lighting Interface (DALI) system, the system comprising:
   the handheld device including a first display area and a second display area;
   wherein each lighting instrument includes a plurality of non-programmed icons in the DALI system, the non-programmed icons being displayed in the second display area;
   wherein the DALI system includes a DALI bus and a lighting instrument set;
   wherein the DALI bus is electrically connected to a plurality of wireless control modules and the lighting instrument set is electrically connected to the DALI bus;
   wherein the wireless control modules associated with the handheld device form a distributed host;
   wherein each wireless control module includes a read unit for reading updated data in the DALI system, and a storage unit for storing data read by the read unit; and
   wherein the handheld device is connected to one of the wireless control modules having a strongest signal.

2. The system using the handheld device for programming lighting instruments of claim 1, wherein each lighting instrument is assigned by a unique address.

3. The system using the handheld device for programming lighting instruments of claim 1, wherein the handheld device is wirelessly communicated with each wireless control module in a two-way form.

4. The system using the handheld device for programming lighting instruments of claim 1, wherein each wireless control module is connected to the DALI system by wire.

* * * * *